United States Patent [19]

Middleton et al.

[11] Patent Number: 4,843,554
[45] Date of Patent: Jun. 27, 1989

[54] AIRPLANE TAKEOFF AND LANDING PERFORMANCE MONITORING SYSTEM

[75] Inventors: David B. Middleton, Yorktown; Raghavachari Srivatsan, Newport News; Lee H. Person, Yorktown, all of Va.

[73] Assignee: The United States of America as represented by the United States National Aeronautics and Space Administration, Washington, D.C.

[21] Appl. No.: 82,766

[22] Filed: Aug. 6, 1987

[51] Int. Cl.⁴ .................. G06F 16/48; G06G 7/70
[52] U.S. Cl. .................................. 364/427; 73/178 T
[58] Field of Search .............. 364/427, 428, 429, 430; 73/178 T

[56] References Cited

U.S. PATENT DOCUMENTS

| | | |
|---|---|---|
| 3,111,577 | 11/1963 | Graffenreid et al. |
| 3,504,335 | 3/1970 | Hall et al. ................. 73/178 T |
| 4,122,522 | 10/1978 | Smith ........................ 364/427 |
| 4,147,056 | 3/1979 | Muller ...................... 73/178 T |
| 4,251,868 | 2/1981 | Aron et al. ................ 364/427 |
| 4,454,582 | 6/1984 | Cleary et al. ............. 364/427 |
| 4,638,437 | 1/1987 | Cleary et al. ............. 364/427 |

FOREIGN PATENT DOCUMENTS 0166487  1/1986  European Pat. Off. ........... 364/427

OTHER PUBLICATIONS

Fusca, James A., "Takeoff Monitor Computes Runway Roll", *Aviation Week*, Oct. 13, 1958, pp. 99–105.

Primary Examiner—Eugene R. LaRoche
Assistant Examiner—Nathan W. McCutcheon
Attorney, Agent, or Firm—Harold W. Adams; John R. Manning; Charles E. B. Glenn

[57] ABSTRACT

The invention is a real-time takeoff and landing performance monitoring system which provides the pilot with graphic and metric information to assist in decisions related to achieving rotation speed ($V_R$) within the safe zone of the runway or stopping the aircraft on the runway after landing or take off - abort. The system processes information in two segments: a pretakeoff segment and a real-time segment. One-time inputs of ambient conditions and airplane configuration information are used in the pretakeoff segment to generate scheduled performance data. The real-time segment uses the scheduled performance data, runway length data and transducer measured parameters to monitor the performance of the airplane throughout the takeoff roll. A novel and important feature of this segment is that it updates the estimated runway rolling friction coefficient. Airplane performance predictions also reflect changes in headwind occuring as the takeoff roll progresses. The system displays the position of the airplane on the runway, indicating runway used and runway available, summarizes the critical information into a situation advisory flag, flags engine failures and off-nominal acceleration performance, and indicates where on the runway particular events such as decision speed ($V_1$), rotation speed ($V_R$) and expected stop points will occur based on actual or predicted performance. The display also indicates airspeed, wind vector, engine pressure ratios, second segment climb speed, and balanced field length (BFL). The system detects performance deficiencies by comparing the airplane's present performance with a predicted nominal performance based upon the given conditions.

25 Claims, 16 Drawing Sheets

AIRPLANE TAKEOFF AND LANDING PERFORMANCE MONITORING SYSTEM

ORIGIN OF THE INVENTION

The invention described herein was jointly made by employees of the United States Government and a contract employee in the performance of work under NASA Grant No. NCC1-79, and is subject to the provisions of Public Law 96-517 (35 USC 202) in which the contractor has elected not to retain title.

BACKGROUND OF THE INVENTION

1. Field of the Invention

The invention is related to the field of measuring and testing and more particularly to a takeoff and landing performance monitoring system.

2. Description of the Prior Art

Prior art includes takeoff and landing performance monitoring systems which graphically display the position of an airplane on a runway relative to where particular events are expected to occur. Existing systems generally indicate performance margin, which only informs the pilot when an option becomes unavailable. For instance, see U.S. Pat. No. 4,638,437, Jan. 20, 1987, Cleary et al. Thus, the pilot using conventional airplane performance monitoring systems receives only an indication that, using maximum thrust, the airplane is still capable of achieving a desired result, not an indication of whether current thrust will achieve this result.

A further limitation of the prior art is that once an estimate of the coefficient of rolling friction is input prior to takeoff, it remains constant. Likewise, the prior art fails to compensate for any change in the headwind during the takeoff run.

Another limitation of the prior art is that valuable status information, such as engine status indications and predicted stopping positions are not displayed.

A further limitation of the prior art is that takeoff and stopping information are provided on two sides of the display, rather than integrated into a single advisory flag.

OBJECTS AND SUMMARY

An object of this invention is to improve upon the prior art by continuously evaluating the status of the airplane and immediately annunciating performance deficiencies, thereby informing the pilot of deficiencies while time for corrective action may still be available.

A further object of the invention is to monitor the amount of runway already used as well as the amount of runway which can be used to achieve rotation speed.

Another object of the invention is to be responsive to differing ambient conditions, such as temperature, pressure altitude, runway winds, runway rolling friction coefficient, and airplane loadin characteristics such as weight and center of gravity.

The invention is an airplane takeoff and landing performance monitoring system which utilizes runway ambient condition, flap setting, and airplane loading characteristic information, input both manually and continuously from transducers to a computer, to generate acceleration history curves for predicting airplane performance during takeoff and landing. The results of the airplane performance predictions are compared with measured performance during the airplane's progress down the runway, and are depicted on a display driven by the computer. An improved estimate of the runway coefficient of rolling friction may be derived by comparing measured with predicted performance.

The take-off and landing performance monitoring system provides the pilot with graphic and metric information to assist in decisions related to achieving rotation speed ($V_R$) within the safe zone of the runway or stopping the aircraft on the runway after landing or take off abort.

One-time inputs of ambient temperature, pressure altitude, runway wind, airplane gross weight, selected flap and stabilizer setting are utilized in generating a set of standard acceleration performance data. Runway length available for rotation, the runway length available for stopping, an estimated runway rolling friction coefficient and instantaneous measurements of throttle position, engine pressure ratios, calibrated airspeed, along-track acceleration, and ground speed are used in computing engine parameters and airplane acceleration, monitoring the runway distance used, runway distance remaining, and in predicting the runway distance needed to achieve rotation speed, and the runway needed to stop the airplane. A comparison of measured and predicted values is utilized in detecting performance deficiencies. These comparisons and the runway length computations lead to GO/ABORT signals. An important feature of the algorithm is that the estimated runway rolling friction is updated based on measured acceleration performance, resulting in more accurate predictions of future performance. Airplane performance predictions also reflect changes in headwind occurring as the takeoff roll progresses.

The system displays the position of the airplane on the runway, indicating runway used and runway available, summarizes the critical information into a situation advisory flag, flags engine failures and off-nominal acceleration performance, and indicates where on the runway particular events such as decision speed ($V_1$), rotation speed ($V_R$) and expected stop points will occur based on both measured and predicted performance. The display also indicates airspeed, wind vector, engine pressure ratios, second segment climb speed, and balanced field length (BFL)

DESCRIPTION OF THE DRAWINGS

Other objects, features, and advantages of the invention will become apparent from the following detailed description of some preferred embodiments when read in conjunction with the appended drawings wherein.

DETAILED DESCRIPTION OF THE INVENTION

Figure 1:
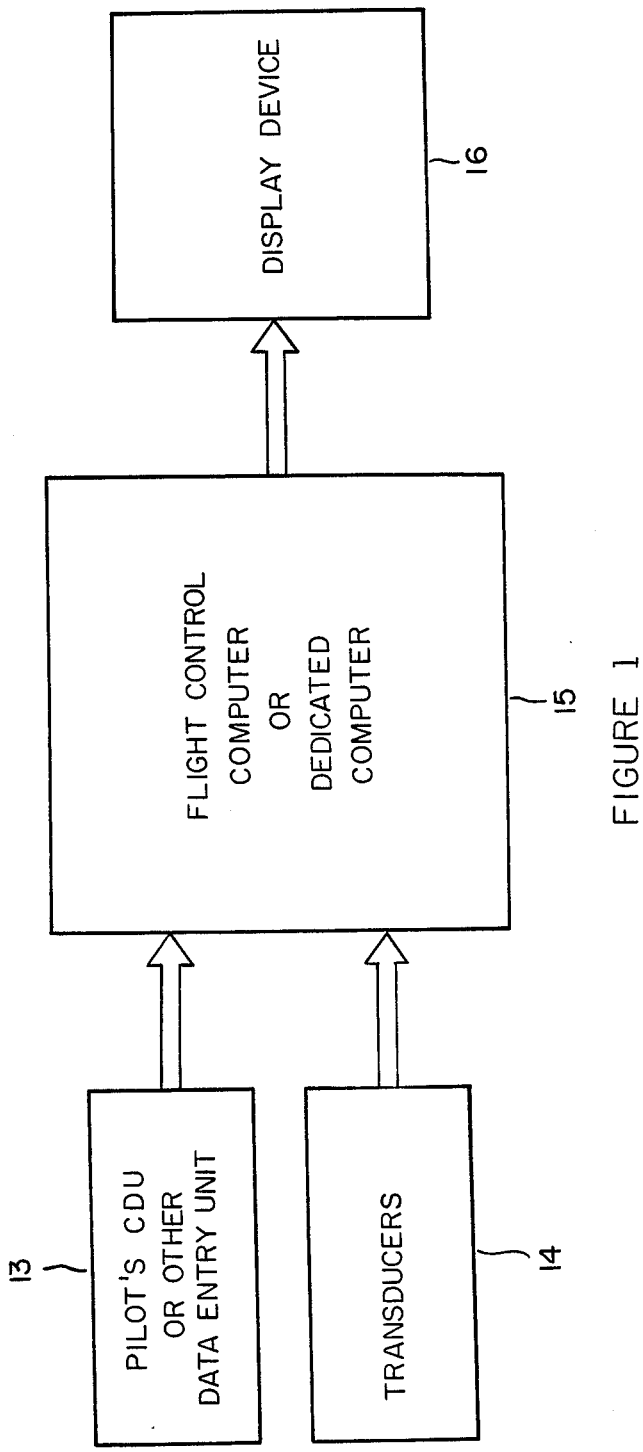
FIG. 1 is a block diagram of the invention.

A preferred embodiment of a system in accordance with the invention is illustrated in FIG. 1, as generally comprising a plurality of transducers 14 for measuring parameters affecting airplane performance, a computer means 15 for receiving and operating upon input data from said plurality of transducers and for driving a display 16 arranged to graphically depict status information in an easily monitored format.

Conventional transducers 14 may be used to measure throttle position, engine pressure ratio, ground speed, along-track acceleration and calibrated airspeed. As is well known, these transducers 14 may be positioned throughout the airplane, their outputs being collected at the cockpit and incorporated in to a conventional instrument panel such as may be found in a Boeing 737 manufactured by the Boeing Company. In the present invention, these transducer outputs are gathered together at a transducer interface panel 13, from whence they become inputs to the computer means 15.

The preferred embodiment incorporates the airlplane's flight control computer, a Norden model 11/70, as computer means 15; in this case, the inputs from many of the transducers are interfaced to the computer means 15 by the airplane manufacturer. Alternatively, many commercially available computers, such as a Digital Equipment Corp. PDP 11/70, provide an acceptable substitute.

Ambient temperature and pressure, runway wind, airplane weight, flap and stabilizer settings can be input from transducers 14 or manually, using a device such as the Navigation and Control Display Unit (NCDU) found in the Boeing 737 or equivalent data entry device compatible with the selected computer means. The NCDU 17, which normally is used to enter navigational and other information into the airplane's flight control computer, also serves as an input device in the preferred embodiment of the takeoff and landing performance monitoring system.

As will be explained, algorithms within the computer 15 operate on the input data to generate a prediction of the airplane's acceleration performance. During the airplane's progress down the runway, these predictions are compared with measured airplane performance. Performance deficiencies are flagged and new predictions are made, taking into account the most recent measured performance data.

After the computer means 15 receives and operates upon the information from the NCDU and the transducers 14, the results are transmitted to the display device 16 using computer-to-display interfacing techniques familiar to those skilled in the art. The preferred embodiment utilizes a Horizontal Situation Inidicator (HSI) found in a Boeing 737 as a display device. However, as is known, a dedicated device such as a Sperry Arinc size D display could also be used. The HSI display device 16 usually accomodates a map display used for navigation, however, while the airplane is on the ground this device serves as display unit for the takeoff and landing performance monitoring system. Once liftoff occurs, the takeoff and landing performance monitoring system display is replaced by the normal HSI information.

The system in accordance with the invention monitors takeoff and landing performance by continuously comparing the airplane's actual performance with a nominal performance, including predictions of the runway length needed to attain rotation speed, the distance required to stop the airplane, and the remaining runway length.

At any point during the takeoff roll, the amount of runway required to achieve rotation speed is a function of the instantaneous speed of the airplane and how well it will accelerate until rotation speed. The instantaneous acceleration of the airplane is given by $$a = \frac{Th - D - \mu(W - L)}{m} \quad (1)$$

| | | |
|---|---|---|
| where $a$ = Acceleration | (feet/sec/sec) | |
| $Th$ = Thrust | (lbs) | |
| $D$ = drag | (lbs) | |
| $\mu$ = rolling friction coefficient | | |
| $W$ = weight | (lbs) | |
| $L$ = lift | (lbs) | |
| $m$ = mass = $W/g$ | (slugs) | |
| $g$ = gravitational acceleration | (feet/sec/sec) | |

Figure 2:
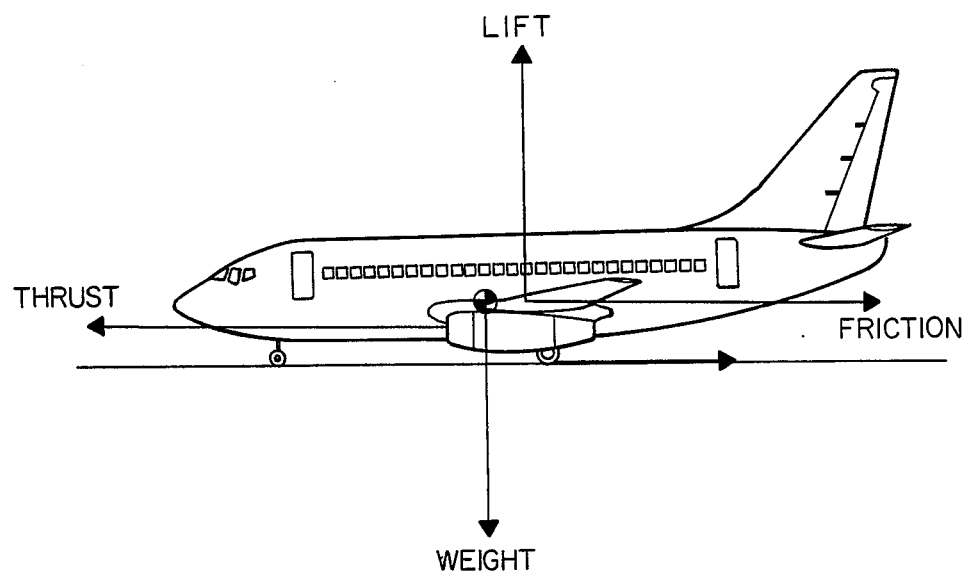
FIG. 2 depicts the instantaneous forces acting on an airplane during takeoff roll.

FIG. 2 shows the forces acting on the airplane. The thrust varies with the airspeed and the friction coefficient depends on runway and tire condition.

Airplane acceleration represents a composite measure of the performance of the airplane, therefore, performance deficiencies can be detected by comparing actual instantaneous acceleration with a predicted nominal value.

The takeoff and landing performance monitoring system algorithm consists of two segments: a pretakeoff segment and a real-time segment. For each takeoff the pretakeoff segment is utilized to generate nominal performance data particular to that takeoff run. The real-time segment keeps track of the runway used, the runway remaining, the runway needed to achieve rotation speed, and the runway needed to bring the airplane to a complete stop. These lengths and a comparison of the actual airplane performance with the nominal value from the pretakeoff segment is used in the GO/ABORT recommendation.

In the pretakeoff segment, the airplane acceleration performance is predicted for two extreme values of rolling friction coefficients: a low value ($\mu = 0.005$) and a high value ($\mu = 0.040$) using the inputs: pressure altitude, ambient temperature, airplane weight, center of gravity location, and selected flap setting.

Figure 3:
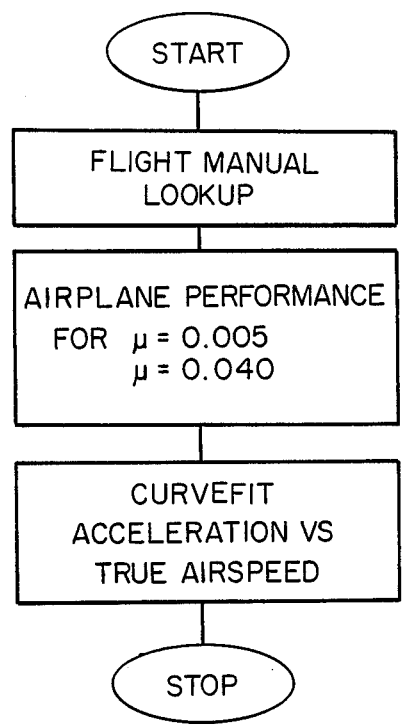
FIG. 3 is a flowchart of the pretakeoff segment.

The algorithm consists of three parts as shown in FIG. 3 and can be run off-line on the onboard computer 15 or on ground support computers (not shown) with the results downloaded to the airplane computers.

The first part performs a flight manual look-up to determine the recommended engine pressure ratio for takeoff, the decision speed, and the rotation speed. The throttle setting needed to achieve the engine pressure ratio is also computed.

Figure 4:
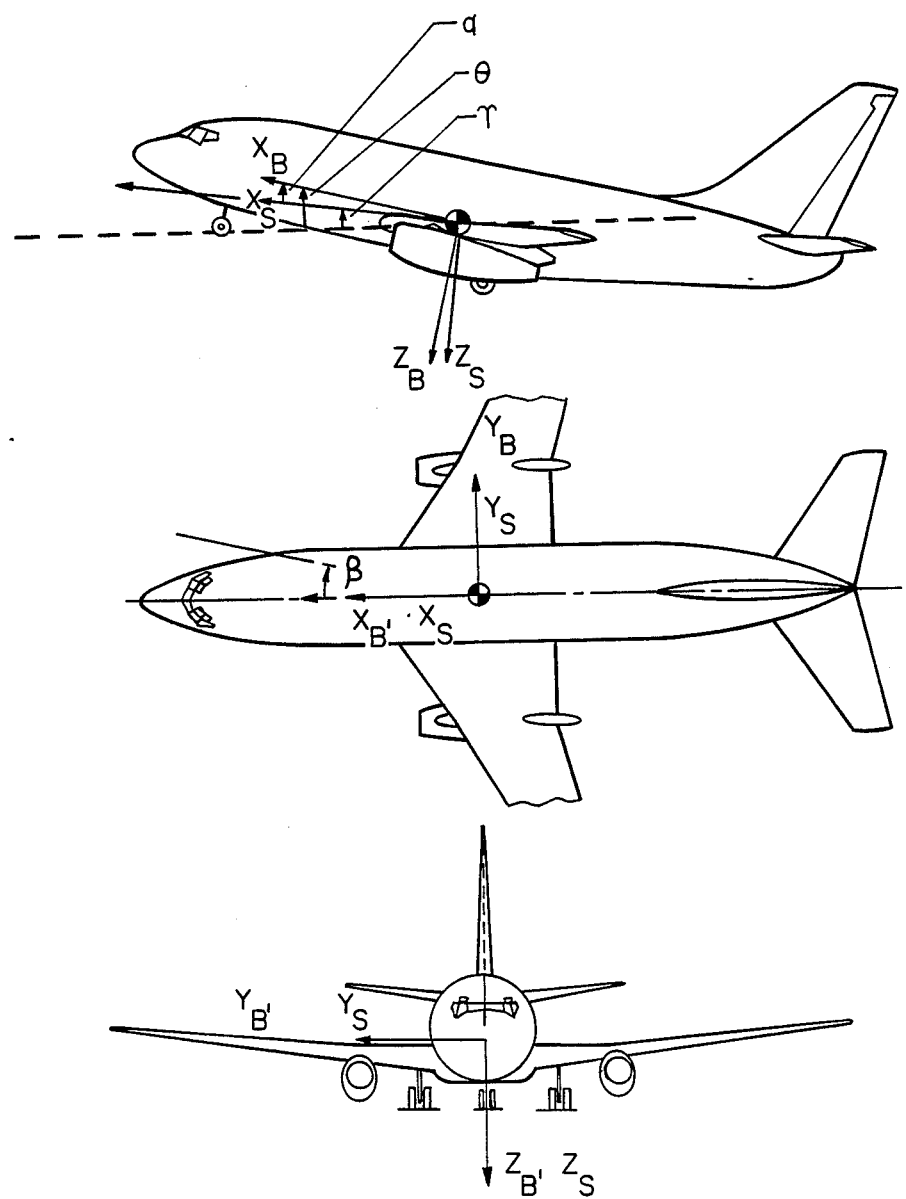
FIG. 4 depicts the axes system used in analyzing the forces acting on the airplane.

The second part of this segment computes the airplane's scheduled acceleration performance as follows. First the aerodynamic coefficients are extracted from the aerodynamic data base for the airplane as a function of the motion variables. The aerodynamic forces and moments are computed in the airplane stability axis system. These forces and moments are then transformed into the body axis system (as seen in FIG. 4). The components of the engine forces and moments along the body axes are determined using a manufacturer supplied engine mode. A manufacturer supplied landing gear model is utilized in computing the forces and moments generated by it along the body axis system.

The resultant forces acting through the center of gravity along the body X and Z axes are obtained as $$F_{X_{Btotal}} = F_{XB} + THR_{XB} + L_{G_{XB}} \quad (2)$$

$$F_{Z_{Btotal}} = F_{ZB} + THR_{ZB} + L_{G_{ZB}} \quad (3)$$

the resultant moment about the body Y-axis (the pitching moment) is given by $$M_{Btotal} = M_B + THR_{MB} + L_{G_{MB}} \quad (4)$$

Using these forces, moments and body X and Z components of gravitational acceleration, the airplane acceleration along the body axes as $$\dot{u}_B = (F_{X_{Btotal}}/m) - g\sin\theta_B + (r_B v_B - q_B w_B) \quad (5a)$$

$$\dot{w}_B = (F_{Z_{Btotal}}/m) - g\cos\theta_B + (q_B u_B - p_B v_B) \quad (5b)$$

$$\dot{H}_{CG} = u_B\sin\theta - w_B\cos\theta \text{ with } p_B = r_B = 0. \quad (5c)$$

The pitching moment and the body Y-axis moment of inertia are used in computing the pitch acceleration using $$\dot{q}_b = M_{Btotal} I_{yy} \quad (6)$$

The rate of change of pitch attitude is written as $$\dot{\theta}_B = q_B \quad (7)$$

The parameters ($\dot{\theta}_B$, $\dot{U}_B$, $\dot{H}_{CG}$, $W_B$, $\dot{q}_B$, $v_G$) are integrated using a second order Adam-Bashworth numerical integration scheme $$x_{n+1} = x_n + (\Delta T/2)(3\dot{x}_n - \dot{x}_{n-1}) \quad (8)$$

to obtain new values for $\theta_B$, $u_B$, $H_{RWY}$, $w_B$, $q_B$, $D_{RWY}$). Throttle position serves as the input to a throttle servo with the following dynamics:

$$\simeq_{th}(n\Delta T) = \xi \simeq_{th}[(n-1)\Delta T] + (1-\xi)\simeq_{thC}(n\Delta T) \quad (9)$$

The last part of this segment deals with curve fitting the along track acceleration, a, as a function of the airplane true airspeed, $V_T$, to generate a set of coefficients for a "nominal performance" data set for the takeoff run. A least-square-error cubic polynomial curve fit method is utilized to generate $$a = A_O + A_1 v_T + A_2 v_T^2 + A_3 v_T^3 \quad (10)$$

Figure 5:
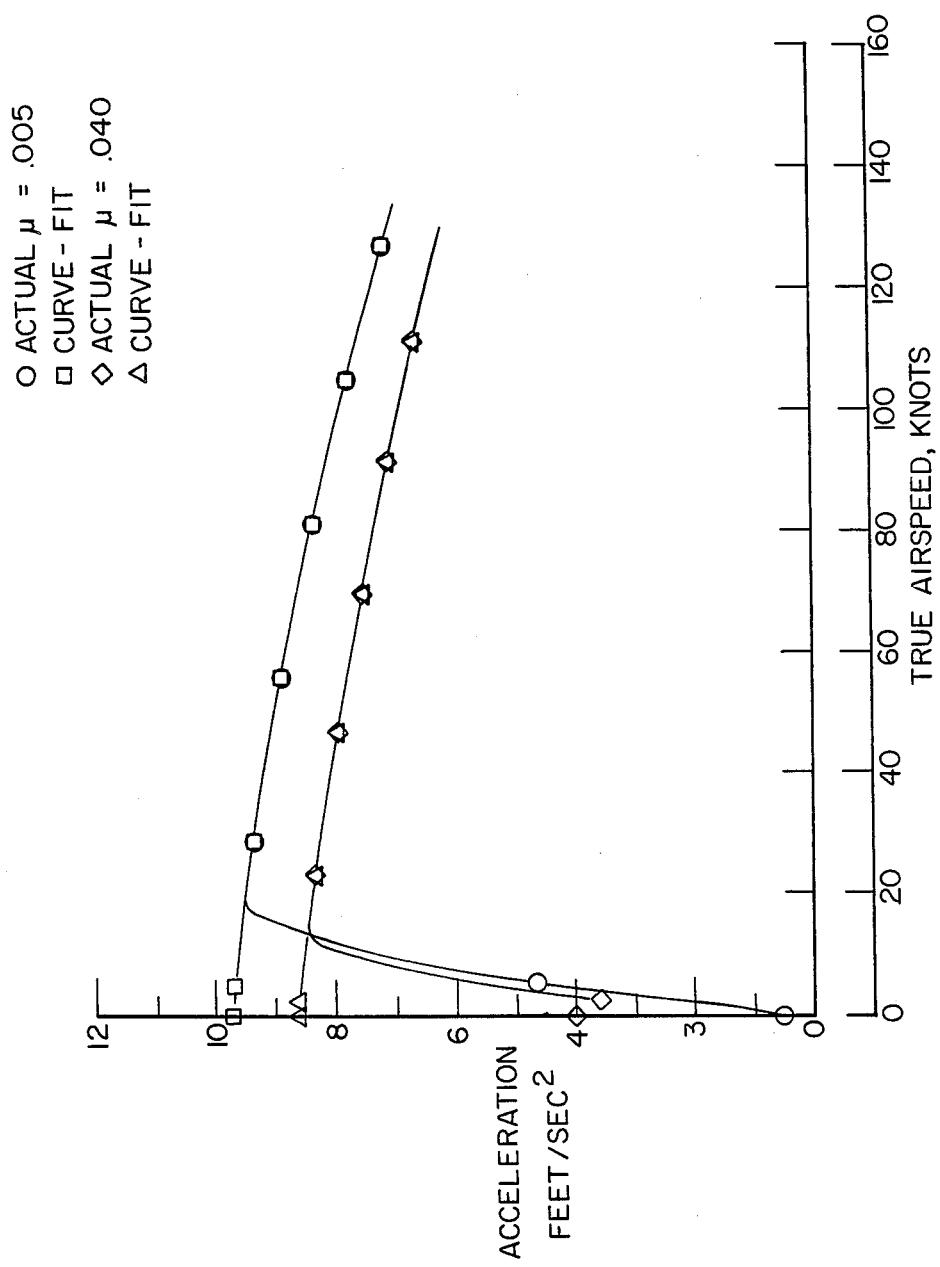
FIG. 5 is an example of an acceleration history curve generated by the takeoff and landing performance monitoring system for a particular set of takeoff conditions.

This process is carried out twice; once for the low friction coefficient and a second time for the high friction coefficient. FIG. 5 illustrates the results obtained from the pretakeoff segment for one set of typical takeoff conditions.

Figure 6:
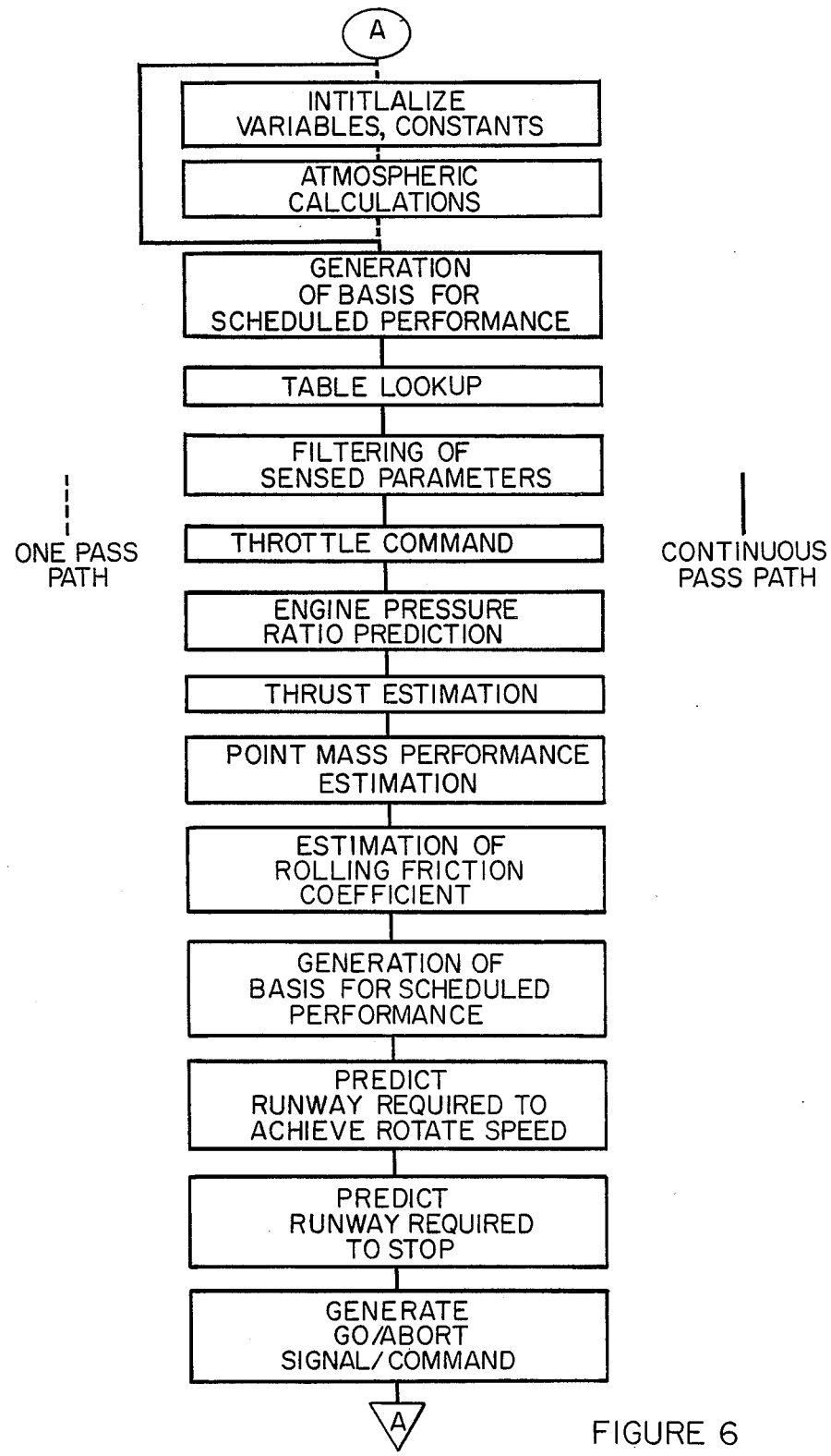
FIG. 6 is a flowchart of the real-time segment.

A block diagram of the real-time segment is shown in FIG. 6. This segment performs the following functions:
1. Initially calculates the required throttle setting for takeoff
2. Monitors the engine in terms of its engine pressure ratio
3. Monitors the performance of the airplane in terms of its acceleration performance
4. Estimates the runway rolling friction coefficient
5. Predicts the runway required to achieve rotation speed
6. Predicts the runway required to stop the airplane and
7. Generates GO/ABORT signals.

The real-time segment requires several input parameters. Some of these are one-time inputs while others are continuously needed inputs. Ambient temperature, ambient pressure, runway wind, weight, flap setting, stabilizer setting, runway available for rotation, runway available for stopping, and nominal rolling friction coefficient are one-time inputs, whereas throttle position, engine pressure ratio, ground speed, along track acceleration, and calibrated airspeed are needed continuously.

The pressure altitude and ambient temperature inputs are used to compute the air density, and temperature and pressure ratios (atmospheric calculations) once during the real-time segment.

The generation of a basis for scheduled performance consists of interpolating between the sets of coefficients generated in the pretakeoff segment (equation 10) to obtain a set of coefficients corresponding to the input value for nominal rolling friction coefficient. This computation gives an initial basis for performance comparisons.

Two table lookups are performed in this segment. The first lookup obtains the flight manual recommended stabilizer setting for the given airplane loading configuration. The nominal lift and drag coefficients for the present takeoff roll, increments in lift and drag coefficients with full deflection of the flight and ground spoilers are also determined. The other lookup function is identical to the one in the pretakeoff segment.

Values for the continuously needed parameters are supplied by sensors on the airplane. Before use by the system these sensor outputs are processed through a filter implementation. The measured acceleration and ground speed are processed through a second order complementary filter to estimate the bias present in the acceleration signal as follows:

$$\underline{x}_{n+1} = \phi \underline{x}_n + r\underline{u}_n \quad (11a)$$

where $$\underline{x} = \begin{bmatrix} x(1) \\ x(2) \end{bmatrix}$$

$$\underline{u} = \begin{bmatrix} v_G \\ a_M \end{bmatrix}$$

$$V_G = x(1) \quad (11b)$$

$$a_{F1} = a_M + x(2) \quad (11c)$$

The acceleration output from the complementary filter ($a_{F1}$), measured values of engine pressure ratio (left & right), and calibrated airspeed are passed through a first order lag filter to remove noise and the outputs from this filter are the values used by the system.

From the manufacturer supplied engine model corresponding to the specific type of airplane involved, an empirical model of the steady state behavior of the engine pressure ratio and thrust is extracted and used to predict these parameters as follows:

$$EPR_{\substack{left \\ right}} = f(\delta_{th\,\substack{left \\ right}}, Temp_{total}) \quad (12)$$

$$THR_{\substack{left \\ right}} = f(EPR_{\substack{left \\ right}}, MACH) \quad (13)$$

A point mass formulation of the equations of motion is used to estimate the performance of the airplane. First the wind speed and measured ground speed are combined to obtain true airspeed, mach number and dynamic pressure. The nominal lift and drag coefficients yield the lift and drag forces. Combining these with the weight and rolling friction coefficient (input value), and the estimated thrust (based on measured engine pressure ratio) results in an estimated airplane acceleration. The measured ground speed is numerically integrated (rectangular integration) to obtain distance along the runway.

The new estimate of the current air speed ($C\hat{A}S$) is derived by summing the previously derived ground speed ($V_G$) and the headwind component of the runway wind speed ($V_{WRWY}$)

$$C\hat{A}S = V_G = V_{WRWY} \quad (14)$$

The new estimate of the headwind component of the runway wind speed ($\hat{V}_{WRWY}$) is derived by adding the previous estimate of the headwind component of the runway wind speed ($V_{WRWY}$) to te difference between the measured current airspeed (CAS) and the estimate of the current airspeed ($C\hat{A}S$) derived in equation 14.

$$\hat{V}_{WRWY} = V_{WRWY} + (CAS - C\hat{A}S) \quad (15)$$

Another salient feature of this algorithm is the update of the runway friction coefficient in real-time. The estimation takes place as follows. First, the thrust is represented as a cubic in airspeed $$THR = T_0 + T_1 v_T + T_2 v_T^2 + T_3 v_T^3 \quad (16)$$

At any true airspeed, the acceleration corresponding to two rolling friction coefficients can be written as $$\hat{a} = g - (T_O - \hat{\mu}_1 W) + T_1 v_T + (T_2 - \tfrac{1}{2}\rho S C_D + \tfrac{1}{2}\hat{\mu}_1 \rho S C_L) v_T^2 + T_3 v_T^3 / W \quad (17a)$$

$$a = g - (T_O - \hat{\mu}_2 W) + T_1 v_T + (T_2 - \tfrac{1}{2}\rho S C_D + \tfrac{1}{2}\rho S C_L) v_T^2 + T_3 v_T^3 / W \quad (17b)$$

Subtracting a from $\hat{a}$ and solving for the difference in friction coefficients $$\Delta \hat{\mu} = \hat{\mu}_2 - \hat{\mu}_1 \quad (18)$$
$$= (\hat{a} - a)/(g(W - \tfrac{1}{2}\rho S C_L v_T^2)/W)$$

where $\hat{\mu}_2$ = estimate of the actual runaway friction coefficient
$\hat{\mu}_1$ = assumed friction coefficient
$\Delta \hat{\mu}$ = estimated difference in the friction coefficients Thus the actual rolling friction coefficient is estimated as $$\hat{\mu}_2 = \hat{\mu}_1 + \Delta \hat{\mu} \quad (19)$$

Immediately after this process the basis for scheduled performance is recomputed with $\mu_2$ as the present estimate of the friction coefficient.

The runway required to achieve rotation speed is computed by a ten step rectangular integration scheme between the present true airspeed and the true airspeed for rotation The acceleration in each interval is assumed to remain constant at a value given by the scheduled performance basis for the true airspeed at the midpoint of the interval.

To calculate the estimated stopping distance, the system simulates the effect of a series of commands to deploy the flight and ground spoilers to reduce the throttle to an idle setting, and to apply full braking. The computations are based on the following assumptions:

1. The flight and ground spoilers are commanded through servos modelled as first order lags.
2. With full braking the rolling friction coefficient is increased by a constant amount over the present value.
3. Maximum wheel braking is achieved in a ramp fashion per given time period.
4. Thrust is assumed to vary linearly with throttle position from the present value to idle thrust (reaching idle thrust for a throttle position of zero).
5. Changes in lift and drag coefficients produced by flight and ground spoilers are assumed to vary linearly with deflection.

Using these assumptions in a numerical integration scheme based on incremental time, the stopping distance is computed in a point mass formulation with the lift and drag coefficients computed as $$C_L = C_{Lnominal} + \Delta C_{LFSP} + \Delta C_{LGSP} \quad (20a)$$

$$C_D = C_{Dnominal} + \Delta C_{DFSP} + \Delta C_{DGSP} \quad (20b)$$

and the friction coefficient as $$\mu = \mu_{nominal} + \Delta \mu_{brake} \quad (20c)$$

The engine pressure ratio is used as a check on engine status. After allowing time for the engine transients to die out, the measured value is compared with the predicted value (corresponding to the measured throttle position). If this difference is more than a preselected limit an engine failure flag is set.

$$\frac{|EPR_{1/r} - E\hat{P}R_{1/r}|}{EPR_{1/r}} > EPR\text{error limit} \quad (21)$$

$$= > \text{Eng. Fail}_{1/r}$$

At any time after the rolling friction coefficient is estimated, any difference between the measured and the predicted acceleration which exceeds a preselected limit causes a performance failure flag to be set.

$$\frac{|a - \hat{a}|}{a} > a_{error\ limit} \quad (22)$$

$$= > \text{PER. Fail}$$

With these flags, the following conditions result in a Go signal:
1. No engine failure flag or performance failure flag is set and the runway length available is greater than the runway length required to achieve rotation speed.
2. Only one engine failure flag is set and the runway remaining is less than that required for stopping the airplane.
3. Performance failure flag is set without either engine failure flag being set and there is insufficient runway length for stopping.

Figure 7A:
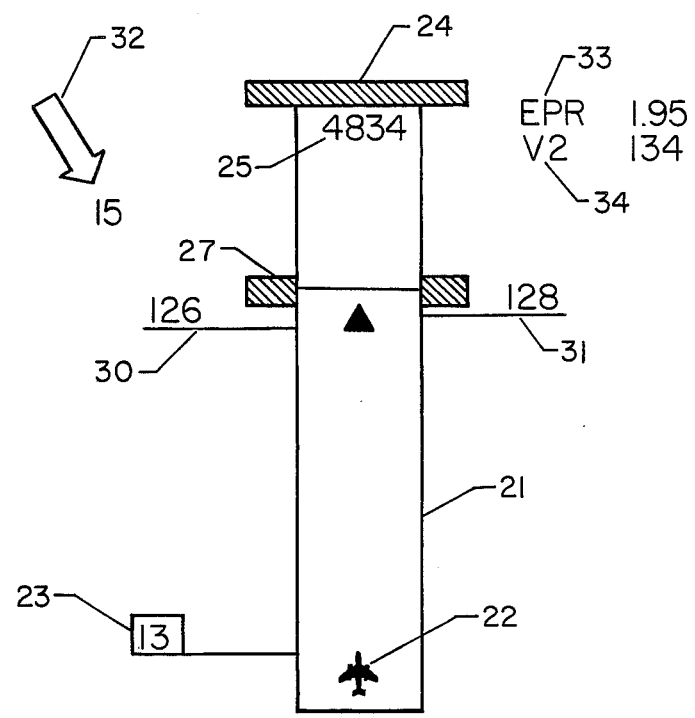
FIG. 7A depicts the display presented to the pilot indicating the balanced field length.

The following conditions result in an Abort signal:
1. Runway length available for achieving rotation speed is less than that required.
2. Both the engine failure flags are set.
3. One engine failure flag sufficient runway length available for stopping.
4. Performance failure flag is set and sufficient runway length is available for stopping. As stated previously, the system algorithm is composed of two segments. The pretakeoff segment is activated prior to the start of the takeoff roll, when the pilot enters ambient condition, loading and configuration information into the system through the NCDU. Once the pretakeoff computations are complete, the display (the HSI in the preferred embodiment) presents the format shown in FIG. 7A. The number at the departure end of the runway (shown as 4834 in the figure) represents the balanced field length (BFL) calculated for the given conditions. The balanced field length is the initial groundroll distance plus the greater of the remaining distance needed for the airplane to clear a predetermined height at the departure end of the runway (35' in the preferred embodiment) after experiencing an engine failure at decision speed or the distance required to brake to a stop after experiencing the same engine failure. (The initial groundroll distance is the distance required for the airplane to attain rotation speed.)

At the lower end of the runway graphic 21 is an airplane symbol 22 whose nose marks current longitudinal position. (Tracking the lateral movement of the airplane on the runway was de-implemented, because it was considered distracting to the pilot.) To the left of the runway symbol 21 (opposite the nose of the airplane) is a horizontal line with a box at one end 23. This line further indicates the airplane's longitudinal position, the number inside the box is Calibrated Airspeed (CAS), in knots. (The line and box advance down the runway with the airplane symbol.) Note, that the nose of the airplane is about 500 ft. from the starting end of the runway: this increment is the "runway offset", representing where the on-ramp being used intersects the runway. The takeoff roll begins here.

Further up the runway, a shaded triangle 29 is shown: the apex indicates the longitudinal position where $V_R$ will be achieved, based on current conditions. The line 31 to the right of the runway (opposite the apex of the triangle) further denotes this position, and the number (128) on it gives $V_R$ in knots. Similarly, the number and line 30 on the left side indicate the $V_1$ speed and where it will be achieved.

In reality, there are two triangles, one lying on top of the other—the shaded one 29 representing the real-time predicition of where $V_R$ will be achieved and an open triangle 28 marking the initial prediction of where it should occur. The open triangle 28 is thus stationary, but the solid triangle 29 and the $V_1$ 30 and $V_R$ 31 lines the updated estimates based on deviations away from nominal conditions.

Just above the position of the triangles is a line 26 that stretches across the runway, with a colored box attached to each end (the boxes lie outside the runway). This line 26 represents the ground roll limit for reaching $V_R$ and the boxes represent engine health flags 27.

The arrow 32 at the top left f the display represents the wind direction (relative to the runway) and the number beside it represents the wind speed in knots. The recommended takeoff Engine Pressure Ratio (EPR) setting 33 and the second segment climb speed ($V_2$) 34 in knots are shown at the top right corner of the display for reference.

Figure 7B:
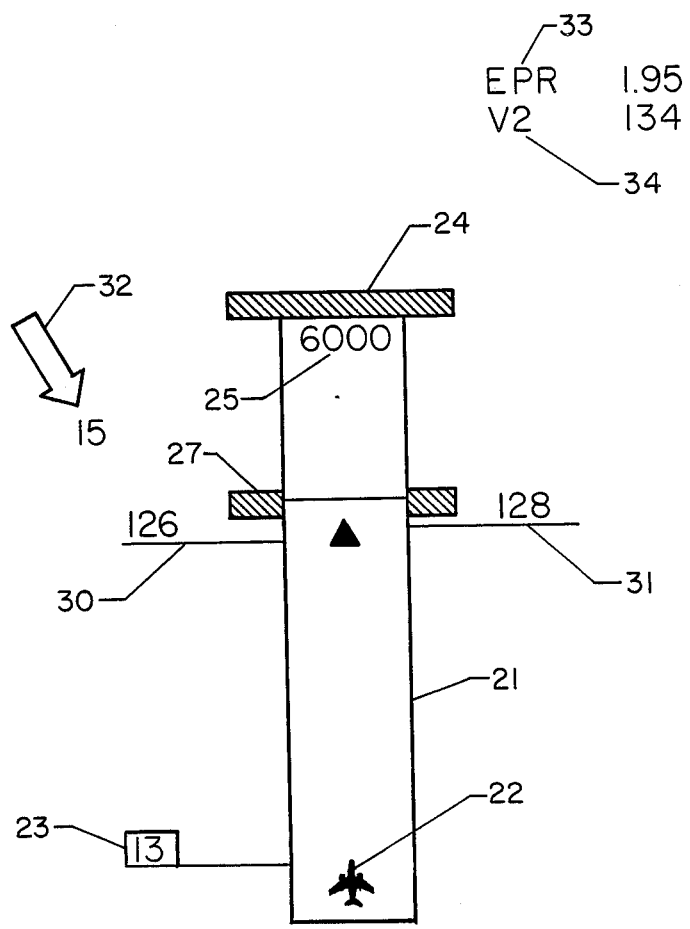
FIG. 7B depicts the graphic rescaling that occurs after the pilot enters the actual runway length.
Figure 7C:
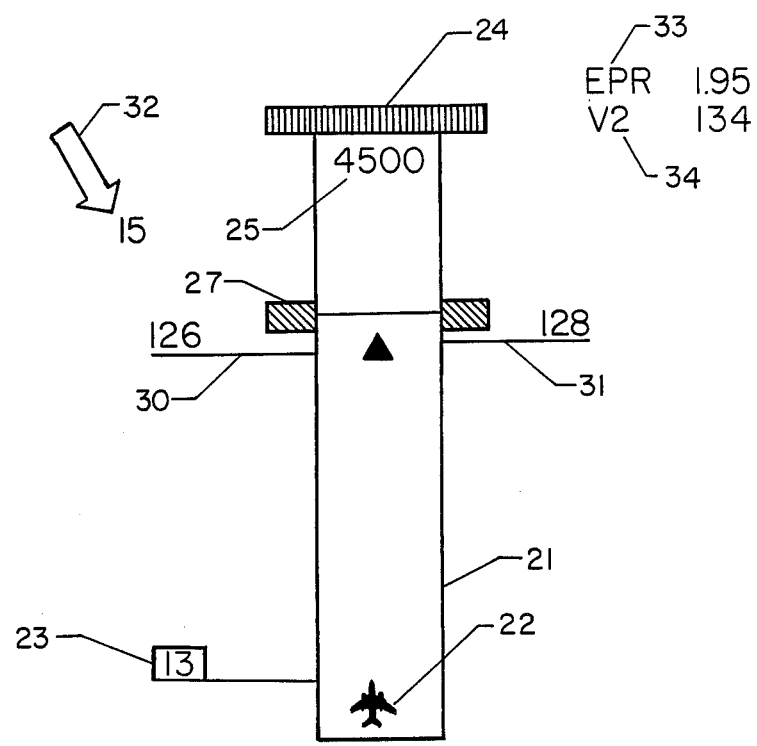
FIG. 7C shows a situation advisory flag warning the pilot that the runway length is insufficient for takeoff under present conditions.

Prior to takeoff, the pilot enters the actual runway length. The system rescales the runway accordingly and inserts the actual runway length in place of the balanced field length as illustrated in FIG. 7B. In the event that the runway length is too short for a safe takeoff, the situation advisory flag warns the pilot as illustrated in FIG. 7C.

Figure 8A:
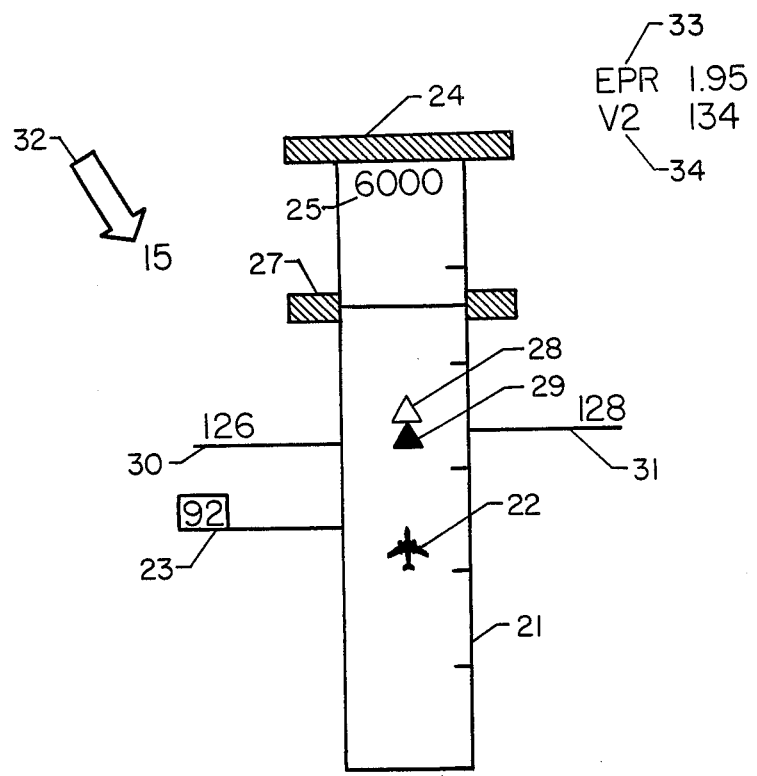
FIG. 8A shows a display indicating that airplane performance exceeds nominal values.

FIG. 8A illustrates a situation with the airplane well into the takeoff run. From the divergence of the triangles 28, 29, it is apparent that the airplane is performing in excess of the predicted nominal performance, because the most recent prediction indicates that rotation speed will be attained sooner than the original nominal prediction. Excess throttle setting above the recommended value or better acceleration performance than expected for the given throttle setting account for this situation.

Figure 8B:
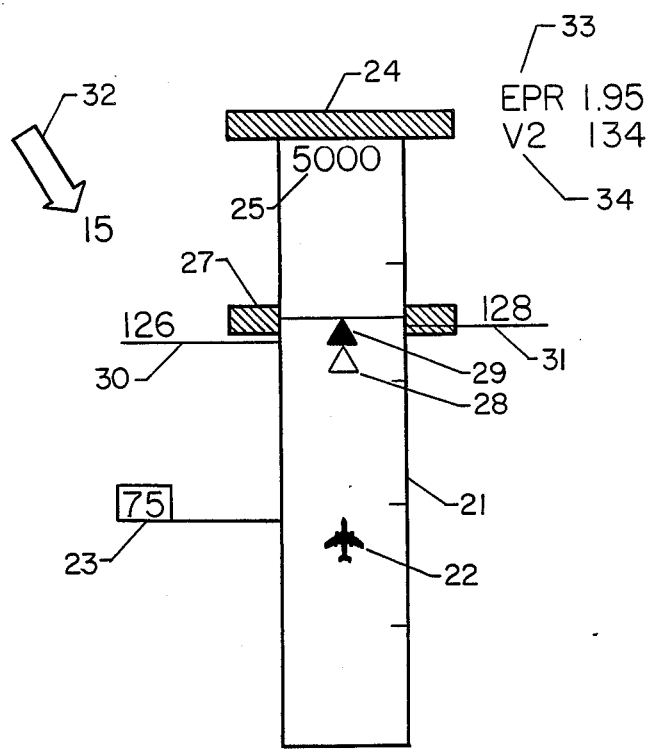
FIG. 8B shows a display indicating sub-nominal airplane performance.

FIG. 8B represents a situation where the airplane performance is below expectation, that is, it is taking longer than expected to achieve rotation speed. Since there is no indication of an engine failure, under performance is due to either a lower than recommended throttle setting or poor acceleration performance.

Figure 8C:
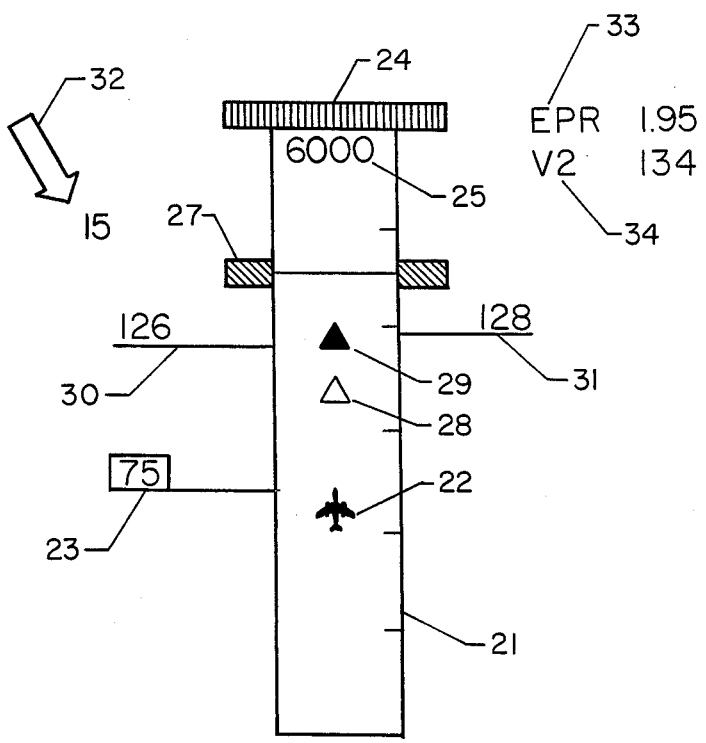
FIG. 8C shows a display indicating an acceleration deficiency greater than 15%:
presented to the pilot when

FIG. 8C shows that the situation advisory flag 24 alerts the pilot whenever the acceleration deficiency reaches an arbitrary value (15% in the preferred embodiment), even if the engines are functioning properly 27.

Figure 9A:
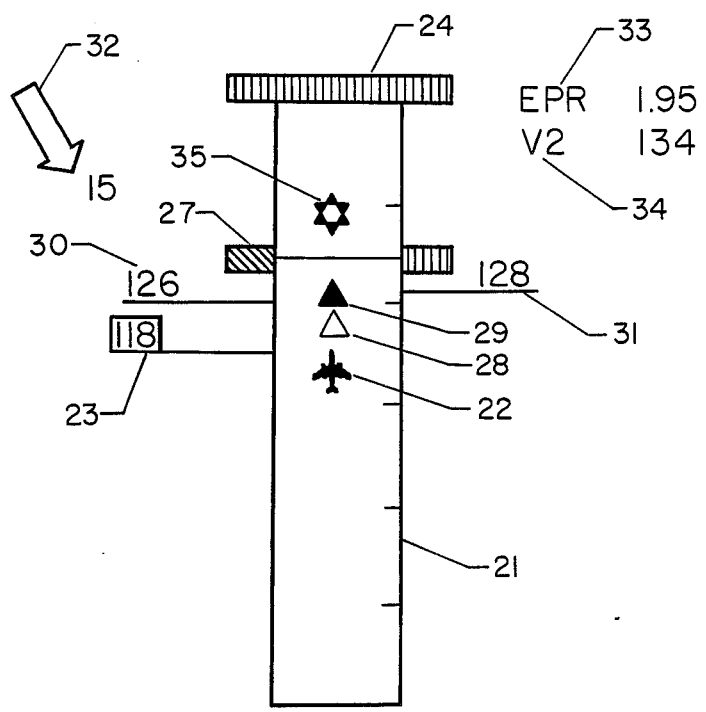
FIG. 9A shows the display an engine becomes inoperative before decision speed is attained.

FIG. 9A shows the display provided when an engine becomes inoperative before decision speed is attained. The star 35 indicates where the airplane will stop with the application of maximum braking and spoilers. The engine inoperative flag 27 changes color to indicate the failure as does the situation advisory flag 24.

Figure 9B:
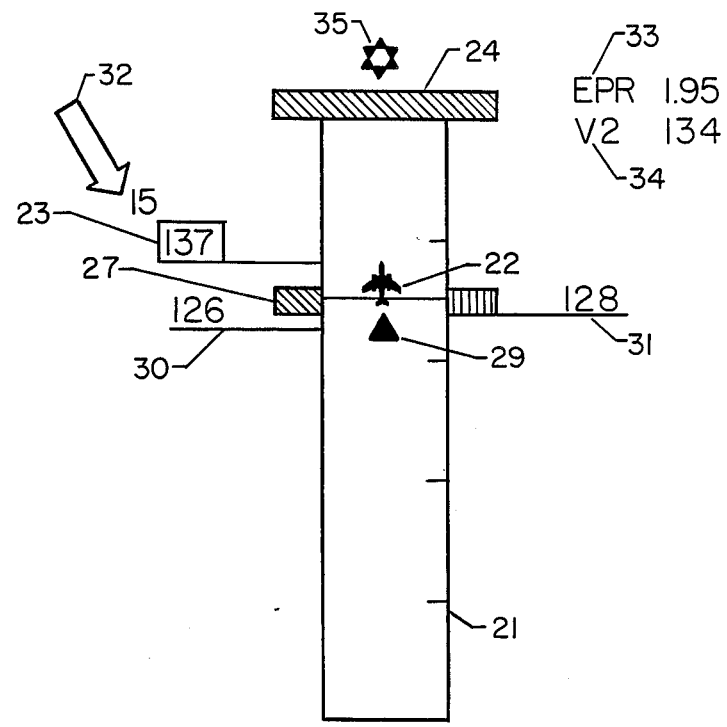
FIG. 9B shows the display presented to the pilot when an engine becomes inoperative after rotation speed has been attained and where inadequate stopping distance remains.

FIG. 9B depicts the situation where an engine becomes inoperative after decision speed has been attained. The location of the star 35 beyond the end of the runway indicates inadequate stopping distance remains. The situation advisory flag 24 recommends continuing with takeoff in spite of the engine inoperative indication 27, because insufficient runway remains for stopping.

Figure 9C:
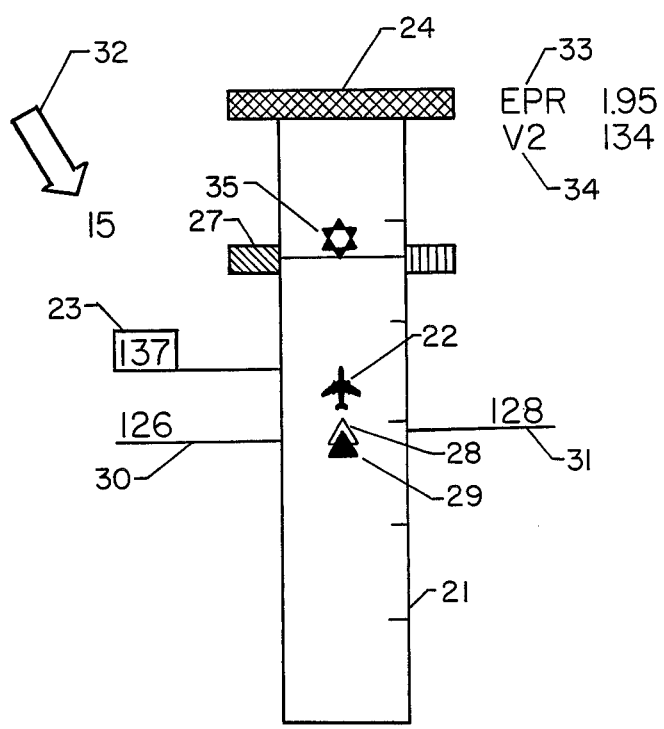
FIG. 9C shows a display where both GO and STOP options remain possible, even though an engine has become inoperative.

FIG. 9C illustrates the condition where an engine becomes inoperative after decision speed has been achieved, but where adequate stopping distance is still available. The situation advisory flag 24 is presented in a third color to indicate that both go and stop options are available; however, current FAA regulations might require the pilot to proceed with takeoff.

Figure 10:
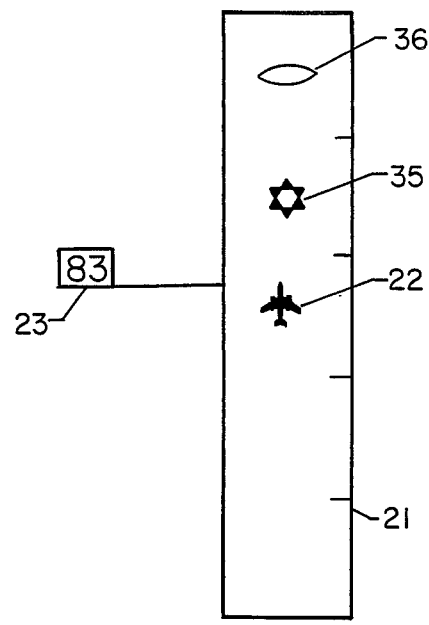
FIG. 10 shows the display presented to the pilot in a landing or abort situation.

The initiation of an abort (executed by a rapid pull back of the throttle) causes most of the takeoff information to be removed leaving only information pertinent to the abort. FIG. 10 shows an abort display. The solid and open triangles, the $V_I$ and $V_R$ lines, the groundroll limit line, the $V_2$ and EPR numerics, the wind vector, and the engine flags disappear from the display. However, the calibrated airspeed 23 in the box to the left of the airplane symbol is replaced by ground speed in knots. The star 35, however, remains (representing the stop point using maximum braking, full spoilers, but no reverse thrust) and a new oval symbol 36 appears on the display. This new symbol indicates the position where the airplane will stop using the present level of deceleration (in this case, less than full braking).

In the preferred embodiment, color changes in the engine and advisory flags have specific meanings for different conditions:

| ENGINE FLAG | |
| --- | --- |
| Color | Meaning |
| Green | Engine Normal |
| Red | Engine Failed |

| COLOR | FLIGHT CONDITION | RECOMMENDATION |
| --- | --- | --- |
| Green | (1) Takeoff is proceeding normally | Continue takeoff |
| | (2) One engine has failed at a speed greater than $V_1$: can reach $V_R$ before reaching groundroll limit but cannot stop within runway remaining | |
| Flashing Amber | (3) One Engine has failed at a speed greater than $V_1$: can reach $V_R$ before reaching groundroll limit and can stop within runway remaining | Can Continue or Abort takeoff |
| Red | (4) Predicted rotation point is beyond groundroll limit line | Abort Takeoff |
| | (5) Both engines have failed | |
| | (6) One engine has failed and speed is less than $V_1$: | |
| | (7) Longitudinal acceleration is not within 15% of nominal | |

While a preferred embodiment of an airplane takeoff and landing performance monitoring system accordance with the principles of the invention has been described in detail, numerous changes in the design within the spirit of the invention which is to be limited only by the scope of the appended claims.

What is claimed as new and desired to be secured by Letter patent of the United States is:

1. In an airplane takeoff and landing performance monitoring system including a display for graphically and continuously depicting the position of an airplane on a runway from and during takeoff relative to where particular events are predicted to occur, the improvement comprising:

transducer means for continuously sensing ambient conditions and airplane loading and acceleration information and generating information signals representative thereof;

computer means responsive to said information signals for generating an acceleration history curve and predicting future airplane performance from and during takeoff and landing based on said acceleration history curve and said information signals; and display means responsive to said computer means for continuously depicting said airplane's position on the runway from and during takeoff and for depicting the predicted location on the runway where said airplane will achieve any particular speed.

2. The invention as defined in claim 1 including a first means in said transducer means for sensing runway conditions and generating a runway coefficient of rolling friction output signal included in said information output signals; and means in said computer means for storing and updating an initial estimated runway coefficient of rolling friction based on said information output signals.

3. The invention as defined in claim 1 including second means in said transducer means for sensing runway wind conditions and generating a runway wind signal during the airplane's travel down the runway and included in said information signals; and means in said computer means for storing and updating an initial wind value based on said information output signals.

4. The invention as defined in claim 1, wherein the display includes indicia means for depicting where on the runway rotation speed is expected to be attained based on the acceleration history curve and information input prior to takeoff.

5. The invention as defined in claim 4, wherein the display includes indicia means for depicting where on the runway rotation speed is expected to be attained based on measured airplane acceleration.

6. The invention as defined in claim 5, wherein the airplane's rotation speed is displayed along the edge of the runway parallel to the indicia means for depicting where on the runway rotation speed is expected to be attained based on measured airplane acceleration.

7. The invention as defined in claim 5, wherein the display includes indicia means for depicting where on the runway the airplane is expected to stop based upon an application of maximum braking and spoilers.

8. The invention as defined in claim 7, wherein the display includes indicia means for depicting the last point on the runway at which the airplane, upon achieving rotation speed, can, with one engine inoperative and using scheduled throttle settings, clear a predetermined height at the departure end of the runway.

9. The invention as defined in claim 8, wherein the indicia means for depicting where on the runway the airplane is expected to stop based application of maximum braking and spoilers is blanked until it passes the indicia means for depicting the last point on the runway at which rotation speed can be attained and result in a safe takeoff.

10. The invention as defined in claim 9, wherein the indicia means for depicting where on the runway the airplane is expected to stop based upon the application of maximum braking and spoilers indicates the loss of a safe stopping option, when its position passes the end of the runway.

11. The invention as defined in claim 7, wherein the display includes indicia depicting where on the runway the airplane is expected to stop based upon its measured deceleration.

12. In an airplane takeoff and landing performance monitoring system with display means for graphically and continuously depicting the position of an airplane on a runway relative to where particular events are to occur from and during takeoff, the improvement comprising:
   first means for sensing and continuously displaying engine operational status and where said predicted events will occur based upon changes in engine operational status.

13. The invention as defined in claim 12, wherein said display includes flag means for indicating engine operational status.

14. The invention as defined in claim 12, wherein the engine pressure ratio is indicated numerically.

15. The invention as defined in claim 3, wherein the display includes indicia means for depicting the winding direction and magnitude.

16. The invention as defined in claim 1, wherein the display includes indicia means for displaying a single summary situation advisory flag.

17. The invention as defined in claim 1, wherein the display includes indicia means for displaying balanced field length prior to takeoff.

18. The invention as defined in claim 17, wherein runway length replaces balanced field length when the particular runway length is entered.

19. The invention as defined in claim 18, wherein the depiction of the runway includes markers indicating 1000' increments from the departure end of the runway.

20. The invention as defined in claim 1, wherein the display includes indicia means for displaying airspeed.

21. The invention as defined in claim 20, wherein ground speed is substituted for airspeed in the event of an abort.

22. The invention as defined in claim 1, wherein the display includes indicia means for depicting where on the runway decision speed is expected to be attained based on measured airplane acceleration.

23. The invention as defined in claim 22, wherein the calculated value for decision speed is displayed along the edge of the runway parallel to the indicia means for depicting where decision speed is expected to occur.

24. An airplane takeoff and landing performance monitoring system as defined in claim 1 wherein:
   (a) said transducer means includes sensor means for determining ambient temperature and pressure, runway wind, airplane weight and center of gravity, flap and stabilizer settings, throttle position, engine pressure ratio, ground speed, along track acceleration and calibrated airspeed and providing electrical signals representing these quantities to a computer means;
   (b) computer data entry means is provided for manually entering runway length information and an estimate of the runway rolling friction coefficient into the computer means;
   (c) said computer means includes means for generating and comparing an initial predicted acceleration curve and the measured acceleration of said airplane from said during takeoff; and
   (d) said display means includes means for displaying the deviation between said predicted acceleration and said measured acceleration.

25. The invention as defined in claim 1, wherein the display means graphically depicts:
   (i) an outline of the runway including 1000' markers from the departure end
   (ii) the position of the airplane on the runway
   (iii) the airspeed of the airplane during takeoff
   (iv) the groundspeed of the airplane during landing or takeoff abort
   (v) a situation advisory flag
   (vi) a runway length numeric
   (vii) a balanced filed length numeric
   (viii) where on the runway rotation speed is expected to be attained based on information input prior to takeoff
   (ix) an updated prediction of where on the runway rotation speed is expected to be attained based upon measured acceleration during the airplane's progress down the runway
   (x) the rotation speed, which is displayed along the edge of the runway parallel to the updated prediction of where rotation speed is expected to be attained
   (xi) where the airplane is expected to stop based upon an application of maximum braking and spoilers
   (xii) the last point on the runway at which rotation speed can be attained and the airplane with one engine inoperative and using scheduled throttle settings can clear a predetermined height at the departure end of the runway
   (xiii) where on the runway the airplane is expected to stop based upon its measured deceleration
   (xiv) engine operational status flags
   (xv) engine pressure ratio
   (xvi) wind direction and magnitude
   (xvii) where on the runway decision speed is expected to be attained based on measured airplane acceleration and predicted acceleration history
   (xviii) the decision speed, which is displayed along the edge of the runway parallel to where on the runway decision speed is expected to be attained.

* * * * *